3,014,008
GRAFT COPOLYMER OF ACRYLONITRILE AND AN UNSATURATED MONOMER WITH A PREFORMED INTERPOLYMER OF A VINYL PYRIDINE AND A COMONOMER
Harry W. Coover, Jr., Kingsport, Tenn., assignor to Eastman Kodak Company, Rochester, N.Y., a corporation of New Jersey
No Drawing. Filed June 2, 1958, Ser. No. 738,947
4 Claims. (Cl. 260—45.5)

This invention relates to modified polyacrylonitriles and to a process for their preparation.

This application is a continuation-in-part of my copending application Serial No. 408,012, filed February 3, 1954 (now United States Patent No. 2,838,470, dated June 10, 1958).

In copending application Serial No. 164,854, filed May 27, 1950 (now United States Patent No. 2,649,434, dated August 18, 1953) of Coover and Dickey, it is shown that valuable polymer products can be obtained by polymerizing acrylonitrile in the presence of preformed "live" homopolymers of various unsaturated monomeric compounds, i.e. homopolymers which have not been separated from their polymerization reaction mixtures, the acrylonitrile being then added to the mixture and polymerization continued to completion. In copending application Serial No. 198,761 filed December 1, 1950 (now United States Patent No. 2,620,434, dated December 2, 1952) of Coover and Dickey, it is shown that still other valuable polymer products can be obtained by polymerizing acrylonitrile in the presence of "dead" homopolymers and copolymers of various unsaturated monomeric compounds, i.e. polymers which have been first isolated from their polymerization reaction mixtures and then acrylonitrile polymerized in the presence of the isolated polymer. In copending application Serial No. 198,762, filed December 1, 1950 (now United States Patent No. 2,657,191, dated October 27, 1953) of Coover and Dickey, it is shown that other valuable polymer products can be obtained by polymerizing acrylonitrile in the presence of "live" interpolymers of various unsaturated monomeric compounds. The processes used in the above applications are all concerned with the homopolymerization of acrylonitrile in the presence of a preformed polymer. Modified acrylonitrile polymers of this kind can be spun into fibers having greatly increased moisture absorption and dyeability. Such fibers have, in addition, all the other desirable physical properties exhibited by fibers produced from straight polyacrylonitrile. They can readily be dry or wet spun into high strength fibers exhibiting various degrees of extensibility depending upon the extent to which and the conditions under which the fibers were drafted. For example, if the fibers are drafted over a range of 100–600 percent and relaxed, the extensibility of the yarn will increase something on the order of 30 percent at low drafts down to 17 or 18 percent at high drafts. Under the maximum drafting and relaxing conditions, it is not possible with these polymers to obtain fibers having extensibility exceeding 30 percent and still retaining tenacity in the order of 2.5–3.0 g. per denier. However, from a textile point of view, it would be highly desirable to be able to produce fibers having not only the outstanding properties such as moisture absorption, dye affinity and other valuable physical properties, but also an extensibility in the range of 30–50 percent.

Polymers prepared according to the processes of the above pending applications can be dissolved in common acrylonitrile polymer solvents up to a limit of about 20 percent solids to give solutions or dopes which are practical for high temperature dry or wet spinning processes. Higher concentrations of these polymers cannot be used due to the tendency of the polymer dopes to set up in the form of a gel. However, from a production point of view it is highly desirable to be able to prepare dopes containing higher concentrations of polymer, i.e. 25 percent or higher, because such higher solids dopes make it possible to produce fibers at a much faster rate. Furthermore, higher solids solutions would be more practical in that less solvent is required per pound of polymer; also the actual spinning costs are less in that less solvent per pound of spun fiber has to be extracted in the wet spinning process or volatilized in a dry spinning process. Another consideration is that in wet or dry spinning processes, especially for high solids dopes, it is necessary to filter the solution free of extraneous materials and gelled particles that may be present so that they will not plug the spinneret. To facilitate filtration, it is necessary to maintain solution temperatures sufficiently high to dissolve completely the polymer and give a homogeneous solution. However, it is well known that solutions of acrylonitrile polymers discolor on heating, which results in poor yarn color. Accordingly, from a product and high quality yarn point of view, it would be highly desirable to provide an acrylonitrile polymer which could be dissolved to give dopes having polymer solids content substantially greater than 25 percent which at the same time could be filtered at relatively low temperatures, thereby making it possible to produce yarns at lower costs and having greatly improved color.

I have now made the unusual and valuable discovery that when small amounts of one or more modifying unsaturated monomers are copolymerized with acrylonitrile in the presence of certain "live" copolymers, i.e. copolymers which have not been separated from their polymerization reaction mixtures, the products obtained show not only good moisture absorption and dyeability, but other greatly improved properties which are especially valuable for textile purposes. For example, I have found that polymers prepared in accordance with the invention are much more readily soluble in acrylonitrile polymer solvents, and their solutions or dopes can be made up to contain from 25–40 percent polymer solids, and that such dopes remain clear, flowable and filterable without any gelling at temperatures below 100° C., in contrast to hitherto known high solids acrylonitrile polymer dopes which still exhibit gelling effects at temperatures substantially above 100° C., for example 100° C. and even higher, and result in discolored fiber and yarn. Furthermore, when the polymers of the invention are spun either by dry spinning or wet spinning processes, the fibers obtained can be more readily drafted and exhibit greatly improved extensibility for any given tenacity, i.e. in the range of 40–50 percent.

I have found further that those of my graft copolymers prepared with vinyl pyridines including both the unsubstituted vinyl pyridines such as 2-vinylpyridine, 3-vinylpyridine and 4-vinylpyridine as well as the corresponding substituted vinylpyridines having one or more alkyl group of 1–4 carbon atoms substituted on the ring, in addition to having the above-mentioned advantages, are characterized by outstanding evenness of dyeing, good affinity for acid wool dyes and improved resistance to bleaching with alkali.

It is, accordingly, an object of the invention to provide a new class of graft copolymers containing a substantial amount of vinylpyridine that are especially outstanding in evenness of dyeing, good affinity for acid wool dyes and improved resistance to bleaching by alkaline agents. Another object is to provide fibers having the above good characteristics. Other objects will become apparent hereinafter.

In accordance with the invention, I prepare my compositions containing vinyl pyridine by heating a polymerization reactions mixture comprising (1) water, (2) from 60 to 95 parts by weight of a monomer mixture of from 85.0 to 99.5% by weight of acrylonitrile and 15.0 to 0.5% by weight of a comonomer selected from the group consisting of a vinyl ester of a saturated monobasic fatty acid containing from 2–4 carbon atoms, e.g., vinyl acetate, vinyl propionate, vinyl isobutyrate, vinyl butyrate, etc., a vinyl pyridine such as defined by the general formula for suitable vinylpyridines appearing hereinafter, e.g., 2-vinylpyridine, 3-vinylpyridine, 4-vinylpyridine, 2-methyl-5-vinylpyridine, 6-methyl-2-vinylpyridine, etc., and an alkyl acrylate wherein the alkyl group contains from 1–4 carbon atoms, e.g., methyl acrylate, ethyl acrylate, propyl acrylate, isopropyl acrylate, butyl acrylate, etc., (3) a polymerization catalyst preferably a peroxygen type, and (4) from 40 to 5 parts by weight of a modifying preformed polymer of a vinylpyridine represented by the following general formula:

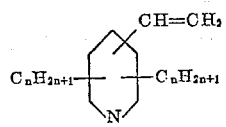

wherein $n$ represents an integer of from 0–4, the said preformed polymer being a copolymer of from 5–95 percent, but preferably 50–80 percent, by weight of the said vinylpyridine and from 95–5 percent, but preferably 50–20 percent, by weight of one or more compounds selected from the group consisting of acrylonitrile, a vinyl ester as defined above, and an N-alkylacrylamide or N,N-dialkyl acrylamide wherein the alkyl group contains from 1–4 carbon atoms, e.g., N-methyl acrylamide, N-ethyl acrylamide, N-butyl acrylamide, N,N-dimethyl acrylamide, N,N-dibutyl acrylamide, etc., until from 70% to approximately 100% of the monomers present have been converted to copolymer. An alternate but less preferable method for preparing generally similar resinous compositions is to employ a "reverse" process, i.e., wherein 60 to 95 parts of the said acrylonitrile monomer mixture is first polymerized and then components in monomeric form of the said modifying vinylpyridine are added thereto and the polymerization continued to form the graft copolymer. The graft copolymers prepared as above defined contain from 60–95 percent by weight of combined acrylonitrile. Suitable modifying preformed copolymers include those prepared with 2-vinylpyridine, 3-vinylpyridine, 4-vinylpyridine, 2-methyl-5-vinylpyridine, 6-methyl-2-vinylpyridine, etc., with any of the mentioned components, i.e., with acrylonitrile, vinyl esters and N-alkyl substituted acrylamides, in the specified proportions.

Advantageously, the polymerizations are carried out in aqueous medium, although other reaction media such as organic solvents can be employed. The term dispersion herein is intended to include both true solutions and emulsions in aqueous or non-aqueous media. For example, a polymerization medium consisting of aqueous acetone or other aqueous solvent can be used. The polymerizations can be accelerated by heat, by actinic light such as ultraviolet light and by the use of well-known polymerization catalysts. Such catalysts are commonly used in the art of polymerization, and my invention is not to be limited to any particular catalyst material. Catalysts which have been found to be especially useful comprise the peroxides (e.g. benzoyl peroxide, acetyl peroxide, acetyl benzoyl peroxide, lauryl peroxide, oleoyl peroxide, triacetone peroxide, urea peroxide, t-butyl hydroperoxide, alkyl percarbonates, etc.), hydrogen peroxide, perborates (e.g. alkali metal perborates, such as those of sodium and potassium, etc.), persulfates (e.g. alkali metal persulfate ammonium persulfate, etc.). Other catalysts such as the ketazines, azines, etc. can be used. The quantity of catalyst used can be varied, depending on the monomer, amount of diluent, etc. Sufficient catalyst can be used to polymerize both the vinylpyridine monomer mixture whereby the modifying preformed copolymer is formed and also the subsequently added acrylonitrile monomer mixture whereby the graft copolymer is formed, or an amount of catalyst sufficient to polymerize only the said vinylpyridine monomer mixture can be used, and additional catalyst can be added with the said acrylonitrile monomer mixture to complete the graft copolymerization step of the process. The latter procedure I have found to be especially advantageous using the same catalyst in both polymerization steps. This procedure provides a readier means for regulating the molecular weight distribution of the polymer composition.

The temperatures at which the process of my invention can be carried out vary from ordinary room temperature to the reflux temperature of the reaction mixture. Generally, a temperature of from 25° to 75° C. is sufficient.

If desired, emulsifying agents can be added to the reaction mixture to distribute uniformly the reactants throughout the reaction medium. Typical emulsifying agents include the alkali metal salts of certain alkyl acid sulfates (e.g. sodium lauryl sulfate), alkali metal salts of aromatic sulfonic acids (sodium isobutyl naphthalene-sulfonate), alkali metal or amine addition salts of sulfo-succinic acid esters, alkali metal salts of fatty acids containing from 12 to 20 carbon atoms, sulfonated fatty acid amides, alkali metal salts of alkane sulfonic acids, sulfonated ethers (e.g. aryloxy polyalkylene ether sulfonates, such as Triton 720), etc.

The polymerization can be carried out in the presence of chain regulators, such as hexyl, octyl, lauryl, dodecyl, myristyl mercaptans, etc., which impart improved solubility properties to the polymer compositions. If desired, reducing agents such as alkali metal bisulfites (e.g. potassium, sodium, etc. bisulfites) can be added to reduce the time required for the polymerization to be effected.

Instead of using an aqueous medium in the polymerizations, it is also possible to use organic solvents such as acetonitrile, aromatic hydrocarbons such as benzene, toluene, etc., liquid alkanes such as n-heptane, etc., aliphatic ethers, acetone, etc. Organic solvents which are water-osluble can also be used with water in the polymerizations. The term dispersion is intended to include both true solutions and emulsions.

The polymerizations can also be carried out in a continuous manner, especially in the second step of polymerization, i.e. wherein the acrylonitrile and the other polymerizable monomer or monomers are copolymerized in the presence of the "live" preformed binary copolymer. The products formed by this method have a number of advantages, for example, they are more homogeneous and have certain improved properties such as better solubility over the products obtained from analogous batch processes. The continuous polymerizations contemplated herein fall into two main groups: (1) those which are used in equipment which permits the continuous addition of reactants and the continuous removal of product (continuous process) and (2) those which are used in batch reactions wherein one or more of the reactants is added continuously during the course of the polymerization, but from which no material is removed during the reaction. In the preferred process, acrylonitrile and the other monomer or monomers containing the specified amount of a regulator such as tertiary dodecyl mercaptan is placed in a suitable storage or supply vessel under an atmosphere of nitrogen. In another storage vessel there is placed under nitrogen, air-free deionized water containing the appropriate amounts of other reactants such as the "live" preformed copolymer modifier contained in its polymerization reaction mixture which may contain some unreacted monomer, an appropriate amount of additional catalyst and an acidic reagent such as phosphoric acid for adjusting the pH of the reaction mixture. A third vessel contains an activator such as potassium metabisulfite in solution in air-free deionized water.

The preferred procedure is to draw continuously the appropriate amounts of solutions or dispersions from the supply vessels to the reactor, subject the mixture to polymerizing conditions, and continuously remove from the reactor the modified polymer containing from 60 to 95 parts by weight of combined acrylonitrile. By this means from 70% to substantially 100% of the monomer can be converted to modified polymer. The length of time between the addition of ingredients to the reactor and the removal of polymer is defined as the contact time. At equilibrium, the polymer emulsion or slurry is removed from the reactor by suitable means at the same total rate as ingredients from the storage vessels are being added. Thus, the contact time in the reactor can be conveniently controlled by the absolute rate of addition of the reactants. Usually, the contact time is between 1 and 3 hours, although longer periods in some cases are advantageous. It will be understood, however, that the above process can be varied in a number of ways. For example, the ingredients to be added can be combined or separated by using a larger number of vessels, or as a practical minimum—two storage vessels, one for the activator and one for the other ingredients. Also the other monomer can be added to the reactor separately or in combination with the acrylonitrile or in combination with one or more of the other ingredients.

In the other process, the various ingredients can also be added to the reactor in a number of ways, for example, as follows: (a) the catalyst, activator, acid component, copolymer modifier, water, etc. are placed in the reaction vessel, and the monomers and regulator are added continuously; (b) the monomers, regulator, catalyst, acid component, copolymer modifier, water, etc., are placed in the reaction vessel and the activator is added continuously; (c) the monomers, regulator, activator, acid component, copolymer modifier, water, etc., are placed in the reaction vessel and the catalyst is added continuously; (d) the monomers, regulator, acid component, copolymer modifier, water, etc., are placed in the reaction vessel and both catalyst and activator, combined or separate, are added continuously; (e) the copolymer modifier, catalyst, acid component and water are placed in the reaction vessel, and the monomers and activator, combined or separate, are added continuously; (f) processes similar to (a) through (e), except that the acid component is eliminated; and (g) processes similar to (a) through (f), except that the activator is eliminated. For further details of the continuous process, reference can be had to copending application of Coover and Shields, Serial No. 407,954, filed February 3, 1954 (now United States Patent No. 2,883,360, dated April 21, 1959).

The following examples will serve to illustrate further the manner whereby I practice my invention.

Example 1

1.5 g. of 2-methyl-5-vinylpyridine and 1.0 g. of vinyl acetate were emulsified in 90 cc. of water containing 1.0 g. of sodium lauryl sulfate, 0.01 g. of potassium persulfate and 0.01 g. of sodium bisulfite. Polymerization was carried out by heating the mixture at 35° C. for 5 hours to give the copolymer. Then 7.5 g. of acrylonitrile, 1.0 g. of methyl acrylate, 0.1 g. of potassium persulfate and 0.05 g. of sodium bisulfite were added to the reaction mixture and the polymerization completed by heating at 40° C. for an additional 6 hours. The isolated and washed graft copolymer obtained weighed 9.8 g.

It was soluble in dimethylformamide and fibers spun from this solution had a tenacity of 2.8 g./d. and a softening point above 215° C. The fibers showed excellent affinity for acid wool dyes, being evenly dyed and very resistant to bleaching with sodium hydroxide solutions.

Example 2

1.5 g. of 2-methyl-5-vinylpyridine and 0.5 g. of N-methylacrylamide were emulsified in 80 cc. of distilled water containing 1.0 g. of aryloxypolyethylene sulfonated ether, 0.01 g. of potassium persulfate and 0.01 g. of sodium bisulfite. The emulsion was heated at 40° C. with agitation for 5 hours. The emulsion was cooled to room temperature and 7.2 g. of acrylonitrile, 0.8 g. of 2-methyl-5-vinylpyridine 0.06 g. of potassium persulfate and 0.06 g. of sodium bisulfite were added. The polymerization was completed by heating at 40° C. for an additional 6 hours. Yield of isolated, washed graft copolymer was 9.69 g. The graft copolymer was soluble in dimethylformamide.

Fibers obtained from the graft copolymer had a tenacity of 2.9 g./d. and a softening point above 215° C. The fibers showed excellent affinity for acid wool dyes which gave even colorings that were highly resistant to alkaline solutions.

Example 3

2.4 g. of 2-methyl-5-vinylpyridine and 0.6 g. of acrylonitrile were emulsified in 90 cc. of water containing 1.0 g. of sodium lauryl sulfate, 0.03 g. of potassium persulfate and 0.03 g. of sodium bisulfite. The emulsion was heated at 40° C. for 6 hours. Then 6.7 g. of acrylonitrile, 0.3 g. of vinyl acetate, 0.01 g. of potassium persulfate and 0.01 g. of sodium bisulfite were added and polymerization completed by heating at 40° C. for an additional 6 hours. The yields of isolated, washed graft copolymer was 9.7 g. The polymer was easily soluble in dimethylformamide. Fibers spun from the graft copolymer had a tenacity of 2.6 g./d. and a softening point above 210° C. The fibers showed excellent affinity for acid wool dyes, the color being deep and even, and very resistant to alkaline solutions.

By proceeding according to the above examples, other generally similar graft copolymers having like good characteristics of dyeing can be prepared with any of the other mentioned preformed vinyl pyridine polymers and acrylonitrile monomer mixtures. Thus, there can be substituted for the 2-methyl-5-vinyl pyridine in the above examples, a like amount of 2-vinylpyridine, 3-vinylpyridine, 4-vinylpyridine, 2-methyl-6-vinylpyridine, etc., i.e. any of the vinylpyridines coming within the given general formula, to give graft copolymers and fibers of generally similar properties. All of the graft copolymers of the invention are soluble in one or more acrylonitrile polymer solvents such as ethylene carbonate, γ-butyrolactone, N-methyl-2-pyrrolidone, dimethyl sulfoxide, dimethyl sulfone, etc., with or without added, fillers, pigments, etc., and the dopes, in addition to spinning to fibers, can also be coated onto smooth surfaces to give flexible, tough films and sheets which are useful for photographic film supports and other purposes. The graft copolymers of the invention are also compatible with polyacrylonitrile or with acrylonitrile polymers containing 85% or more of acrylonitrile.

The invention has been described in detail with particular reference to preferred embodiments thereof, but it will be understood that variations and modifications can be effected within the spirit and scope of the invention as described hereinabove and as defined in the appended claims.

What I claim is:

1. A graft copolymer of (1) from 60 to 95 parts by weight of a monomer mixture consisting of from 85.0 to 99.5% by weight of acrylonitrile and from 15.0 to 0.5% by weight of at least one compound selected from the group consisting of a vinyl ester of a saturated monobasic fatty acid containing from 2–4 carbon atoms, an unsubstituted vinylpyridine, a vinylpyridine having at least one alkyl group substituent on the nucleus, said alkyl group containing from 1–4 carbon atoms, and an alkyl acrylate wherein the alkyl group contains from 1–4 carbon atoms, and (2) from 40 to 5 parts by weight of a preformed copolymer derived by the polymerization of a mixture comprising from 5–95% by weight of a compound represented by the general formula:

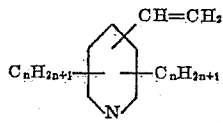

wherein $n$ represents an integer of from 0–4, and from 95–5% by weight of at least one compound selected from the group consisting of acrylonitrile, a vinyl ester of a saturated monobasic fatty acid containing from 2–4 carbon atoms, an N-alkyl acrylamide wherein the alkyl group contains from 1–4 carbon atoms, and an N,N-dialkyl acrylamide wherein each alkyl group contains from 1–4 carbon atoms, the said graft copolymer having a different composition than said preformed copolymer.

2. A graft copolymer of (1) from 60–95 parts by weight of a monomer mixture consisting of from 85.0 to 99.5% by weight of acrylonitrile and from 15.0 to 0.5% by weight of methyl acrylate, and (2) from 40–5 parts by weight of a preformed copolymer derived by the polymerization of a mixture comprising from 5–95% by weight of 2-methyl-5-vinylpyridine and from 95–5% by weight of vinyl acetate, the said graft copolymer having a different composition than the said preformed polymer.

3. A graft copolymer of (1) from 60–95 parts by weight of a monomer mixture consisting of from 85.0 to 99.5% by weight of acrylonitrile and from 15.0 to 0.5% by weight of vinyl acetate, and (2) from 40–5 parts by weight of a preformed copolymer derived by the polymerization of a mixture comprising from 5–95% by weight of 2-methyl-5-vinylpyridine and from 95–5% by weight of acrylonitrile, the said graft copolymer having a different composition than said preformed polymer.

4. A graft copolymer of (1) from 60–95 parts by weight of a monomer mixture consisting of from 85.0 to 99.5% by weight of acrylonitrile and from 15.0 to 0.5% by weight of 2-methyl-5-vinylpyridine, and (2) from 40–5 parts by weight of a preformed copolymer derived by the polymerization of a mixture comprising from 5–95% by weight of 2-methyl-5-vinylpyridine and from 95–5% by weight of N-methylacrylamide, the said graft copolymer having a different composition than said preformed copolymer.

UNITED STATES PATENTS
References Cited in the file of this patent

| | | |
|---|---|---|
| 2,640,049 | Rothrock | May 26, 1953 |
| 2,749,325 | Craig | June 5, 1956 |
| 2,838,470 | Coover | June 10, 1958 |